July 3, 1956
H. P. TROENDLY ET AL
2,753,027
ONE-WAY ENGAGING MECHANISM
Filed Feb. 7, 1952
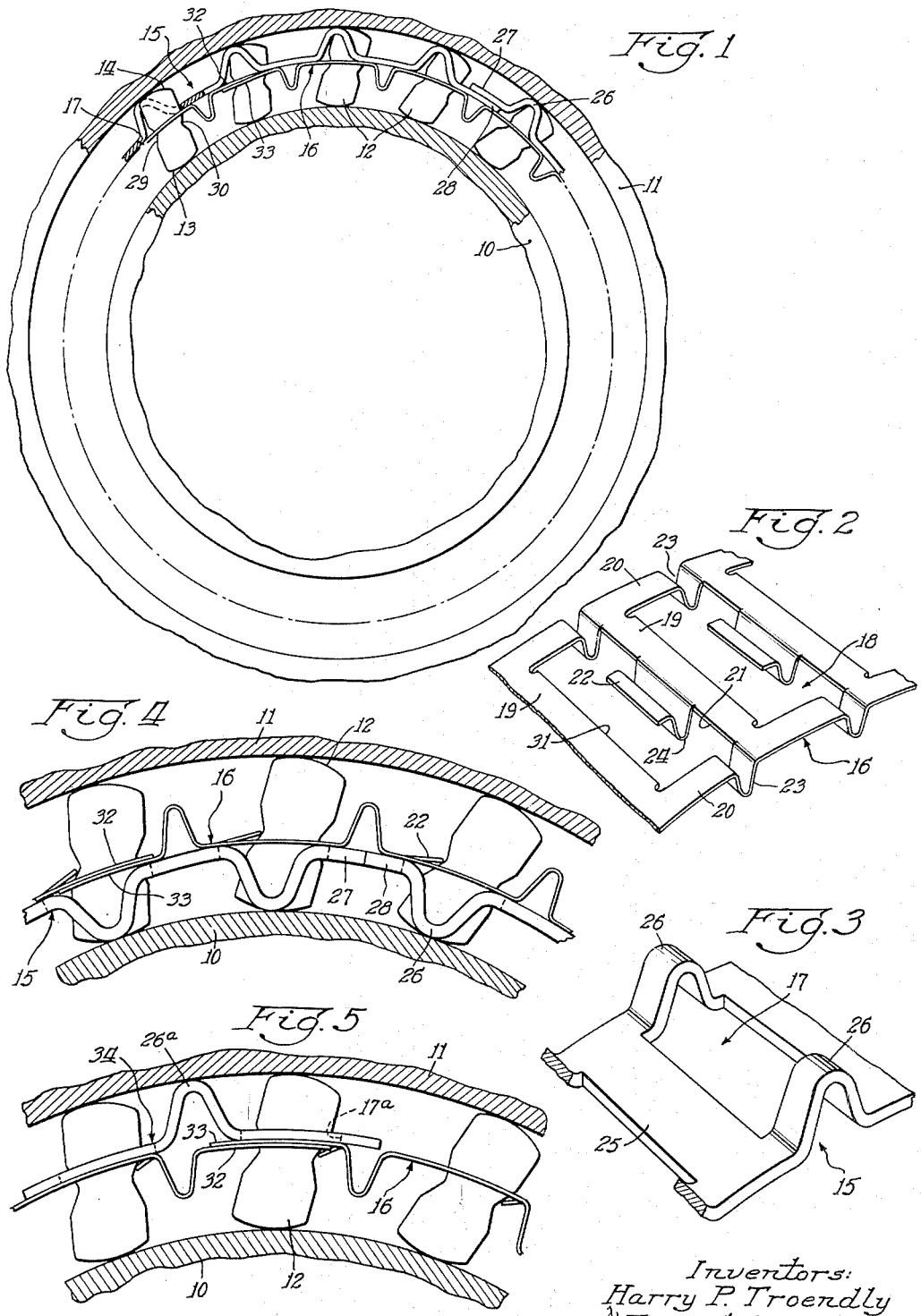
Inventors:
Harry P. Troendly
and Ernest A. Ferris
By: Frank C. Parker
Atty

United States Patent Office 2,753,027
Patented July 3, 1956

2,753,027

ONE-WAY ENGAGING MECHANISM

Harry P. Troendly, La Grange Park, and Ernest A. Ferris, Oak Park, Ill., assignors to Borg-Warner Corporation, Chicago, Ill., a corporation of Illinois Application February 7, 1952, Serial No. 270,394

19 Claims. (Cl. 192—45.1)

The present invention relates generally to one-way engaging devices and more particularly to one-way engaging devices of the type employing tiltable sprags or grippers disposed between a pair of substantially concentric races and having a resilient sprag retainer or energizing cage for spacing the sprags between the races and tilting the sprags into wedging engagement with the races.

The present invention comprises an improvement in one-way engaging devices of the general type disclosed in the copending applications of E. A. Ferris, Ser. No. 202,385, filed December 22, 1950, and of H. P. Troendly and E. A. Ferris, Ser. No. 263,064, filed December 24, 1951.

The principal object of the present invention is to provide an improved one-way engaging device of the general type referred to above, wherein the resilient sprag retainer comprises a strip of flexible sheet metal having its ends overlapping each other and wherein the retainer is disposed substantially concentrically between the concentric races of the device. The present invention makes it possible to manufacture the resilient sheet metal sprag retainer in long continuous lengths which can be cut to provide the proper length for the retainer for engaging devices of any diameter, thereby eliminating the high cost of manufacturing due to expensive tooling otherwise needed for making an annular retainer having its ends joined together.

Another object of the invention is to provide a rigid member for use in conjunction with the resilient sheet metal sprag retainer, wherein, the rigid member has a pair of openings for receiving an adjacent pair of sprags and is deformed between these openings so that it engages one or the other of the races to radially position the member between the races. In the present invention, the overlapping ends of the resilient energizing cage or sprag retainer are bridged by the rigid member, the rigid member functioning to maintain the overlapping ends of the resilient retainer in substantially concentric alignment with the remainder of the resilient cage.

The deformations in the rigid member assume the form of transverse wrinkles or corrugations which may engage one or the other of the races with frictional engagement sufficient to cause the sprags and cage assembly to be carried with the one of the races engaged by rigid member during the overrunning condition of the mechanism when the sprags are ineffective to engage and connect both races together for rotation together in unison.

In one form of the invention the ends of the transversely wrinkled rigid member overlap and an inherent stress imparted to the member, causing it to continuously tend to straighten, is effective to maintain each of the wrinkles in engagement with the outer race so that the member is maintained properly radially positioned between the races. In another form of the invention the rigid member is inherently stressed so that it continuously tends to contract and, in this form of the invention, the rigid member is disposed with its wrinkles engaging the inner race.

It is also contemplated that the ends of the wrinkled rigid member may be disposed in substantially abutting relationship. With this construction the force of frictional engagement between the wrinkled rigid member and the race which it engages is dependent to a great extent upon the permitted contraction of the member before the ends thereof actually engage and abut one another. This construction is desirable when the wrinkled rigid member is to engage the outer race with a high frictional force or the inner race with a light frictional force.

The foregoing objects and advantages of the present invention will become apparent from the following detailed description when read in conjunction with the accompanying drawings wherein:

Fig. 1 represents a side elevational view of one form of the present invention;

Fig. 2 represents a fragmentary perspective view of one form of the resilient sprag retainer which may be used in the present invention;

Fig. 3 is a fragmentary perspective view of the rigid cage structure;

Fig. 4 is a fragmentary sectional view of a second embodiment of the invention; and Fig. 5 is a fragmentary sectional view of a third embodiment of the invention.

Referring to the drawings, wherein like reference numerals in the different views identify identical parts, and referring first to the embodiment of the invention disclosed in Figs. 1, 2 and 3, the one-way engaging mechanism comprises a pair of substantially cylindrical and concentrically mounted inner and outer races 10 and 11, the races being connected respectively with a pair of relatively rotatable shafts (not shown). A plurality of sprags or grippers 12 are disposed between the races 10 and 11 and each of these sprags 12 has a pair of eccentric wedging surfaces 13 and 14 for respectively wedgingly engaging the inner race 10 and the outer race 11 to connect the races together for rotation in unison whenever the outer race 11 tends to rotate counterclockwise relative to the inner race 10. When the outer race 11 tends to rotate clockwise relative to the inner race 10 the sprags or grippers 12 tilt slightly in a clockwise direction out of wedging engagement with the races, thereby permitting the races to rotate relatively. When the sprags 12 tilt clockwise in this manner, the race 11 overruns in a clockwise direction relative to the race 10.

Means are provided for peripherally spacing the sprags 12 between the races 10 and 11, and this means includes a substantially rigid member 15 and a resilient or flexible sheet metal retainer or cage 16. The cages 15 and 16 are respectively provided with openings 17 and 18 for receiving the sprags 12. The openings 18, in the resilient cage 16, are defined on their sides by cross pieces 19 and on their ends by sides 20. Extending into each of the openings 18 from one edge 21 of the cross pieces 19 is an energizing tab 22 integral with the cross pieces 19. A transverse wrinkle 23 is formed in the cage 16 for each of the openings 18 and intersects each side 20 of the openings. The tabs 22 are also provided with transverse wrinkles 24 aligned with the wrinkles 23.

The openings 17, in the rigid member 15, are defined by cross pieces 25, and a transverse wrinkle or corrugation 26, intersecting each of the openings 17, is provided in the rigid member 15. In the Fig. 1 embodiment of the invention the rigid member 15 is mounted between the races 10 and 11 with each of the wrinkles 26 engaging the outer race 11. The ends of the member 15, identified respectively by reference numerals 27 and 28, are disposed in overlapping relationship. The rigid member 15, in the Fig. 1 embodiment of the invention, is under a stress which constantly tends to straighten it and this continuously causes each of the wrinkles 26 to be maintained in engagement with the outer race 11. Accordingly, it is not necessary that the ends 27 and 28 of the rigid member 15 be fastened together.

When the rigid member 15 and resilient cage 16 are assembled between the races, as shown in Fig. 1, the openings 17 and 18 respectively formed in each of these members receive the sprags 12. Each of the sprags 12 is provided with transversely extending notches 29 and 30 and an edge 31 of the cross pieces 19 is seated within the notches 29 while the tabs 22 are seated within the notches 30. As is clear from Fig. 1, the openings 17 in the rigid member 15 are peripherally wider than the sprags 12, and, accordingly, the sprags 12 may move slightly peripherally with respect to the rigid member 15. As is also clear from Fig. 1, the rigid member 15 and resilient cage 16 are engaged at spaced points throughout their peripheries and it is therefore unnecessary that the ends, indicated by reference numerals 32 and 33, of the resilient cage 16 be fastened together by welding or other means. The resilient cage 16 is under a slight stress when assemled as shown in Fig. 1 such that it continuously tends to straighten and this causes the cage to be maintained in concentric alignment with the member 15. The rigid member 15 holds the overlapping ends 32 and 33 of the resilient cage 16 in substantially concentric alignment with the remaining portions of the resilient cage 16.

The transverse wrinkles 24 in each of the tabs 22 provides a peripheral yield between each of the sprags 12 and this peripheral yield has been found to be very important in preventing damage to the structure during operation thereof. In the operation of the engaging mechanism the tabs 22 continuously exert an energizing force on each of the sprags 12 tending to pivot them counterclockwise about the edges 31 of the resilient cage 16 into wedging engagement with both of the races 10 and 11. Whenever there is a tendency for the outer race 11 to rotate in a counterclockwise direction relative to the inner race 10, the sprags 12 normally wedgingly engage the races. It has been found, however, that due to torsional vibration of the shafts to which the races 10 and 11 are secured, or due to vibration of the engaging mechanism as a whole, when relative rotation of the outer race 11 in a counterclockwise direction relative to the inner race 10 begins, one or more of the sprags 12 will initially engage both of the races. Due to the aforementioned vibration, some of these sprags pop out of engagement with the races and move peripherally with respect to the other sprags. The wrinkles 24, in the tabs 22, yield under this condition, and the sprags 12 move peripherally until they engage the sides of the openings 17 in the rigid member 15. The rigid member 15, therefore, takes the shock and immediately thereafter the tabs 22 are again effective to bias the sprags toward wedging engagement with the races 10 and 11. With this construction, it is apparent that little or no damage will be caused to the cross pieces 19 of the resilient cage 16, due to the popping out of engagement of some one or more of the sprags.

With the construction shown in Fig. 1, the transverse wrinkles 26 in the rigid member 15 cause the sprags and cage assembly to rotate with the outer race 11 during the overrunning condition, and, because of the fact that the outer rigid member 15 bridges the ends 32 and 33 of the resilient cage 16, it is possible to effect great economy in the manufacture of one-way engaging devices of this type as it is no longer necessary to utilize expensive tooling for making each of the cages in the form of an annular ring. In other words, the resilient cage and rigid member may be supplied in long lengths and then cut into shorter lengths corresponding to the peripheral length required.

The embodiment of the invention disclosed in Fig. 4 is quite similar to that shown in Fig. 1, comprising the inner and outer races 10 and 11, sprags 12, the rigid member 15 and the flexible or resilient cage 16. The main difference between the two embodiments is that the rigid mmeber 15 is disposed internally with respect to the flexible or resilient cage 16 in this embodiment of the invention, and the energizing tabs 22 act upon the opposite sides of the sprags 12.

The two ends 27 and 28 of the rigid member 15, in the Fig. 4 embodiment, are disposed in abutting relationship thereby making it necessary to more accurately cut the length of the rigid member 15. With this construction, wherein the ends 27 and 28 of the rigid member 15 abut each other, and where the wrinkles 26 of the rigid member 15 engage the inner race 10, the force of frictional engagement between the wrinkles 26 and the inner race 10 is substantially constant. It, of course, will be obvious that when the rigid member 15 is disposed internally with respect to the resilient cage 16, the rigid member 15 will be stressed so that it will continuously tend to contract into engagement with the inner race 10. When the ends 27 and 28 abut each other, the contraction of the member 15 is limited, and the member is stressed peripherally so as to limit the force of frictional engagement with the inner race 10. It is also contemplated that the resilient cage 16, of the Fig. 4 embodiment, will be stressed so that it continuously tends to contract radially and its ends 32 and 33, by reason of their being bridged by the rigid member 15, will be held in substantially concentric alignment with the remaining portions of the resilient cage 16. The Fig. 4 embodiment of the invention functions in substantially the same manner as the Fig. 1 embodiment and, accordingly, it is not deemed necessary to give a detailed description thereof.

It is to be distinctly understood, however, that the ends 27 and 28 of the rigid member 15 may overlap, as shown in Fig. 1, or abut, as shown in Fig. 4, regardless of whether the wrinkles 26 therein engage either the inner race 10 or the outer race 11. When the wrinkled rigid member 15 is external with respect to the flexible cage 16, and the ends 27 and 28 are abutting each other, additional expansive stress may be imparted to the member so that the wrinkles 26 engage the outer race 11 with a greater frictional force.

In the Fig. 5 embodiment of the invention, only a short length of a rigid member 34 is utilized. This embodiment of the invention, however, does include the inner and outer races 10 and 11, the sprags 12 and the resilient cage 16. The short rigid member 34 is provided with a single wrinkle or corrugation 26a for engaging the outer race 11 and, on opposite peripheral sides of the wrinkle 26a, sprag receiving openings 17a are provided. As is obvious from Fig. 5, the short rigid member 34 bridges the overlapping ends 32 and 33 of the resilient cage 16 and maintains them in substantially concentric alignment with the remaining portions of the resilient cage 16. The wrinkle 26a, being in engagement with the outer race 11, functions to radially position the rigid member 34 with respect to the outer race 11 and, due to the contact between the wrinkle 26a and outer race 11, and the contact between the remaining portions of the rigid member 34 and the resilient cage 16, the rigid member is maintained concentrically disposed between the races 10 and 11.

The Fig. 5 embodiment of the invention is applicable principally where rather low torque loads are being transmitted between the races 10 and 11, in which case the force in a peripheral direction of the sprags 12 when they pop out of engagement with the races 10 and 11, due principally to vibration, is not sufficiently great to cause damage to the cross pieces of the resilient cage 16. In such case, the rigid member 34 functions only to bridge the ends 32 and 33 of the resilient cage 16 to hold these ends aligned with the remainder of the cage.

As will be apparent to those skilled in the art, the present invention provides a one-way engaging device which is particularly economical to manufacture. This is due to the fact that by constructing one-way engaging devices in accordance with the principles disclosed herein it is not necessary to provide annular sprag energizing and positioning rings. This eliminates the necessity of utilizing expensive machinery which would otherwise be necessary to accurately form the sprag spacing and energizing rings.

It is contemplated that numerous changes and modifications may be made in the present invention without departing from the spirit or scope thereof.

What is claimed is:

1. In a one-way engaging mechanism, the combination of inner and outer concentric races, a series of sprags tiltable into wedging engagement with both of said races to connect the races together for rotation in unison, and a pair of members disposed concentrically between said races and each having spaced openings therein for peripherally spacing said sprags between said races, one of said members being a strip of resilient sheet material constructed and arranged to have its ends overlapped and having integral energizing tabs extending into said openings and engaging said sprags for continuously biasing said sprags toward wedging engagement with both of said races, the other of said members being deformed to provide a portion thereof for continuously engaging one of said races to radially position the member between said races, said other of said members being constructed and arranged to overlap the ends of said strip.

2. In a one-way engaging device, the combination of a pair of concentric races, a series of tiltable grippers disposed between said races and effective upon being tilted in one direction to wedgingly engage the races and connect them together for rotation in unison and effective upon being tilted in the opposite direction to permit the races to rotate relatively, means for peripherally spacing said grippers between said races and for biasing said grippers toward wedging engagement with both of said races, said means comprising a strip of resilient sheet metal having a series of gripper receiving openings and integral tabs extending into the openings for effecting said biasing of the grippers, said strip of sheet metal being generally concentrically disposed between said races and being constructed and arranged to have its ends overlapping each other, and a member comprising a relatively rigid strip of metal having gripper receiving openings therein and being deformed so that a portion thereof frictionally engages one of said races, said member being constructed and arranged to overlap the ends of said resilient sheet metal strip to hold the ends thereof in substantially concentric alignment with the remaining portions thereof.

3. In a one-way engaging device, the combination of a pair of concentric races, a series of wedging elements disposed between said races, a relatively resilient first cage comprising a strip of resilient sheet material concentrically positioned between said races for spacing said elements peripherally between the races and including means for biasing said elements toward wedging engagement with said races, said strip being constructed and arranged to have the ends thereof in overlapping relation, and a second cage disposed between said races and comprising a relatively rigid strip of metal having a series of openings therein for receiving said elements, said second cage being constructed and arranged to overlap said ends of said strip of resilient material, said openings being larger than said elements to enable limited peripheral displacement of said elements relative to said second cage, said second cage being deformed to provide portions thereof which frictionally engage one of said races to maintain the cage concentrically disposed between the races.

4. In a one-way engaging device, the combination of a pair of inner and outer concentric races, a series of wedging elements disposed between said races, a relatively resilient first cage comprising a strip of resilient sheet material concentrically positioned between said races for spacing said elements peripherally between the races and including means for biasing said elements toward wedging engagement with said races, said strip being constructed and arranged to have the ends thereof in overlapping relation, and a second cage disposed between said races and comprising a relatively rigid strip of metal having a series of openings therein for receiving said elements, said second cage being constructed and arranged to overlap said ends of said strip of resilient material, said openings being larger than said elements to enable limited peripheral displacement of said elements relative to said second cage, said second cage being deformed to provide portions thereof which frictionally engage said outer race to maintain the cage concentrically disposed between the races.

5. In a one-way engaging device, the combination of a pair of inner and outer concentric races, a series of wedging elements disposed between said races, a relatively resilient first cage comprising a strip of resilient sheet material concentrically positioned between said races for spacing said elements peripherally between the races and including means for biasing said elements toward wedging engagement with said races, said strip being constructed and arranged to have the ends thereof in overlapping relation, a second cage disposed between said races and comprising a relatively rigid strip of metal having a series of openings therein for receiving said elements, said second cage being constructed and arranged to overlap said ends of said strip of resilient material, said openings being larger than said elements to enable limited peripheral displacement of said elements relative to said second cage, said second cage being deformed to provide portions thereof which frictionally engage said inner race to maintain the cage concentrically disposed between the races.

6. In a one-way engaging device, the combination of a pair of inner and outer concentric races, a series of wedging elements disposed between said races, a relatively resilient first cage comprising a strip of resilient sheet material concentrically positioned between said races for spacing said elements peripherally between the races and including means for biasing said elements toward wedging engagement with said races, said strip being constructed and arranged to have the ends thereof in overlapping relation, a second cage disposed between said races and comprising a relatively rigid strip of metal having a series of openings therein for receiving said elements, said second cage being constructed and arranged to overlap said ends of said strip of resilient material, said openings being larger than said elements to enable limited peripheral displacement of said elements relative to said second cage, said second cage being deformed to provide corrugations which extend transversely with respect to said races and which frictionally engage one of said races to maintain the cage concentrically disposed between the races.

7. In a one-way engaging device, the combination of a pair of inner and outer concentric races, a series of wedging elements disposed between said races, a relatively resilient first cage comprising a strip of resilient sheet material concentrically positioned between said races for spacing said elements peripherally between the races and including means for biasing said elements toward wedging engagement with said races, said strip being constructed and arranged to have the ends thereof in overlapping relation, a second cage disposed between said races and comprising a relatively rigid strip of metal having a series of openings therein for receiving said elements, said second cage being constructed and arranged to overlap said ends of said strip of resilient material, said openings being larger than said elements to enable limited peripheral displacement of said elements relative to said second cage, the ends of the relatively rigid metal strip comprising said second cage being disposed in abutting relation to peripherally stress the cage and the cage being deformed to provide corrugations which extend transversely with respect to said races, said corrugations frictionally engaging one of said races due to said peripheral stress and thereby maintaining the second cage concentrically disposed between the races.

8. In a one-way engaging device, the combination of a pair of concentric races, a series of tiltable wedging devices disposed between said races, a cage for peripherally spacing said wedging devices between said races comprising a strip of resilient sheet metal having apertures therein for receiving said wedging devices and integral tabs extending into each of said apertures for engaging and biasing the wedging devices into wedging engagement with said races, said resilient sheet material strip being constructed and arranged to have its ends adjacent to each other in a non-fixed relationship, and a rigid member disposed substantially concentrically between said races and having openings therein for receiving a pair of adjacent wedging devices, said rigid member being deformed to provide a portion thereof for engaging one of said races to radially position the member between said races and the rigid member bridging the adjacent ends of said resilient sheet metal strip to substantially peripherally space said pair of wedging devices.

9. In a one-way engaging device, the combination of concentric races, a series of tiltable wedging devices disposed between said races, a cage for peripherally spacing said wedging devices between said races comprising a strip of resilient sheet metal having apertures therein for receiving said wedging devices and integral tabs extending into each of said apertures for engaging and biasing the wedging devices into wedging engagement with said races, said resilient sheet metal strip being disposed substantially concentrically between said races and being constructed and arranged to have its ends overlapping each other, and a member comprising substantially rigid strip of sheet metal defining portions disposed concentrically between said races and having openings for receiving a pair of adjacent wedging devices, said member also defining a wrinkle between said portions for engaging one of said races to radially position the member between said races, said member being constructed and arranged to bridge the overlapping ends of said resilient sheet metal strip to substantially peripherally space said pair of wedging devices.

10. In a one-way engaging device, the combination of a pair of concentric races, a series of tiltable wedging devices disposed between said races, a cage for peripherally spacing said wedging devices between said races comprising a strip of resilient sheet metal having apertures therein for receiving said wedging devices and integral tabs extending into each of said apertures for engaging and biasing the wedging devices into wedging engagement with said races, said resilient sheet metal strip being disposed substantially concentrically between said races and being constructed and arranged to have its ends overlapping each other, and a substantially rigid sheet metal member concentrically disposed between said races including means defining openings for receiving each of said wedging devices and other means corresponding to each of the openings defining transverse wrinkles for engaging one of said races, said member being constructed and arranged to bridge said overlapping ends of the resilient strip to hold the ends thereof in substantially concentric alignment with the remainder fo the resilient strip and said transverse wrinkles being effective to maintain the member substantially in a predetermined radial position between the races.

11. In a one-way engaging device, the combination of a pair of inner and outer races, a series of tiltable wedging devices disposed between said races, a cage for peripherally spacing said wedging devices between said races comprising a strip of resilient sheet metal having apertures therein for receiving said wedging devices and integral tabs extending into each of said apertures for engaging and biasing the wedging devices into wedging engagement with said races, said resilient sheet metal strip being disposed substantially concentrically between said races and being constructed and arranged to have its ends overlapping each other, and a substantially rigid sheet metal member concentrically disposed between said races including means defining openings for receiving each of said wedging devices and other means corresponding to each of the openings defining transverse wrinkles for engaging said outer race, said member being constructed and arranged to bridge said overlapping ends of the resilient strip to hold the ends thereof in substantially concentric alignment with the remainder of resilient strip and said transverse wrinkles being effective to maintain the ring substantially in a predetermined position between the races.

12. A cage assembly for one-way engaging devices of the type having opposed concentric races connectible by a plurality of sprags upon tilting of the sprags into wedging engagement with the races comprising a strip of flexible sheet metal adapted to be flexed into a generally annular configuration with its ends disposed adjacent one another and the strip being adapted to be disposed between the races, said strip having openings adapted to receive the sprags therein, integral energizing tabs extending into said openings and adapted to engage the sprags when they are disposed in the openings for biasing the sprags into wedging engagement with the races, and a substantially rigid member having sprag receiving openings therein, said rigid member being constructed and arranged to bridge the ends of said flexible strip and adapted to engage one of said races to thereby hold the ends of the flexible strip in substantially concentric alignment between the races.

13. A cage assembly as set forth in claim 12 wherein the rigid member comprises a generally elongated strip of rigid material having a deformation in the form of a transverse wrinkle located substantially in the middle thereof and the wrinkle comprising the portion of the rigid member adapted to engage one of the races.

14. A cage assembly as set forth in claim 12 wherein the rigid member comprises an elongated strip having a medial transverse wrinkle comprising the portion of the rigid member adapted to engage one of the races and having end portions which are the portions adapted to hold the ends of the flexible strip in substantially concentric alignment between the races.

15. A cage assembly as set forth in claim 12 wherein the rigid member comprises an elongated strip of rigid material having a substantially annular configuration, the rigid member being adapted to be disposed concentrically with respect to and in engagement with the flexible strip with the sprag receiving openings therein corresponding respectively to the openings in the flexible strip, and the rigid member having transverse wrinkles comprising the portions adapted to engage the one race when the assembly is disposed between the races.

16. A cage assembly as set forth in claim 12 wherein the rigid member comprises an elongated strip of rigid material having a susbtantially annular configuration, the rigid member being adapted to be disposed concentrically outside of and in engagement with the flexible strip with the sprag receiving openings therein corresponding respectively to the openings in the flexible strip, and the rigid member having transverse wrinkles comprising the portions adapted to engage the outer race when the assembly is disposed between the races.

17. A cage assembly as set forth in claim 12 wherein the rigid member comprises an elongated strip of rigid material having a substantially annular configuration, the rigid member being adapted to be disposed concentrically inside of and in engagement with the flexible strip and the sprag receiving openings therein corresponding respectively to the openings in the flexible strip, and the rigid member having transverse wrinkles comprising the portions adapted to engage the inner race when the assembly is disposed between the races.

18. In a one-way engaging mechanism, the combination of inner and outer concentric races, a series of sprags tiltable into wedging engagement with both of said races to connect the races together for rotation in unison, and a pair of members disposed concentrically between the said races and each having spaced openings therein for peripherally spacing said sprags between said races, one of said members comprising a strip of resilient sheet material constructed and arranged to have its ends disposed adjacent one another and having integral energizing tabs extending into said openings and engaging said sprags for continuously biasing said sprags toward a wedging engagement with both of said races, the other of said members being deformed to provide a portion thereof for continuously engaging one of said races to radially position the member between said races, said other of said members being constructed and arranged to overlie the ends of said strip.

19. In a one-way engaging mechanism, the combination of inner and outer races, a series of sprags tiltable into and out of wedging engagement with both of said races, and a pair of members disposed between said races, means on each of said members providing spaced openings therein for receiving and peripherally spacing said sprags between said races, one of said members comprising a strip of resilient sheet material constructed and arranged to have its ends disposed adjacent one another and including integral energizing tabs adapted to engage said sprags and apply a bias to said sprags to urge said sprags toward wedging engagement with said races, the other of said members comprising a relatively rigid metallic strip constructed and arranged to overlie the ends of said one of said members.

References Cited in the file of this patent

UNITED STATES PATENTS

| | | |
|---|---|---|
| 2,366,843 | Dodge | Jan. 9, 1945 |
| 2,399,749 | Lund | May 7, 1946 |
| 2,630,896 | Dodge | Mar. 10, 1953 |